(12) United States Patent
Rahut

(10) Patent No.: US 9,047,246 B1
(45) Date of Patent: Jun. 2, 2015

(54) HIGH AVAILABILITY SCHEDULER

(71) Applicant: Splunk Inc., San Francisco, CA (US)

(72) Inventor: Anirban Rahut, Santa Clara, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 14/448,969

(22) Filed: Jul. 31, 2014

(51) Int. Cl.
| | |
|---|---|
| *G06F 11/00* | (2006.01) |
| *G06F 11/20* | (2006.01) |
| *G06F 9/48* | (2006.01) |
| *G06F 11/14* | (2006.01) |

(52) U.S. Cl.
CPC .......... *G06F 11/2007* (2013.01); *G06F 9/4881* (2013.01); *G06F 2201/85* (2013.01); *G06F 11/1425* (2013.01)

(58) Field of Classification Search
CPC .............. G06F 11/0709; G06F 11/142; G06F 11/1425; G06F 9/4843; G06F 9/4856; G06F 9/4881
See application file for complete search history.

(56) References Cited

U.S. PATENT DOCUMENTS

| | | | | |
|---|---|---|---|---|
| 5,787,250 | A * | 7/1998 | Badovinatz et al. .......... | 709/201 |
| 7,139,790 | B1 * | 11/2006 | Wang et al. .................... | 709/201 |
| 8,074,109 | B1 * | 12/2011 | Roffe .............................. | 714/11 |
| 8,412,696 | B2 | 4/2013 | Zhang et al. | |
| 8,589,403 | B2 | 11/2013 | Marquardt et al. | |
| 8,682,925 | B1 | 3/2014 | Marquardt et al. | |
| 8,924,977 | B2 * | 12/2014 | Meng et al. .................... | 718/102 |
| 2002/0194289 | A1 * | 12/2002 | Engel et al. .................... | 709/208 |
| 2005/0132154 | A1 * | 6/2005 | Rao et al. ....................... | 711/162 |
| 2007/0168508 | A1 * | 7/2007 | Wang et al. .................... | 709/225 |
| 2007/0214355 | A1 * | 9/2007 | Lamport ....................... | 713/156 |
| 2008/0016192 | A1 * | 1/2008 | Smith et al. .................... | 709/223 |
| 2008/0071878 | A1 * | 3/2008 | Reuter ........................... | 709/208 |
| 2008/0137528 | A1 * | 6/2008 | O'Toole et al. ................ | 370/216 |
| 2009/0259741 | A1 * | 10/2009 | Shen et al. ..................... | 709/223 |
| 2010/0114826 | A1 * | 5/2010 | Voutilainen et al. .......... | 707/638 |
| 2012/0254655 | A1 * | 10/2012 | Butterworth ................. | 714/4.11 |
| 2012/0284727 | A1 * | 11/2012 | Kodialam et al. ............. | 718/103 |
| 2013/0067484 | A1 * | 3/2013 | Sonoda et al. ................ | 718/103 |
| 2013/0104140 | A1 * | 4/2013 | Meng et al. .................... | 718/104 |
| 2013/0111261 | A1 * | 5/2013 | Dalton .......................... | 714/4.11 |
| 2013/0124909 | A1 * | 5/2013 | Harpaz et al. .................. | 714/4.1 |
| 2013/0318236 | A1 | 11/2013 | Coates et al. | |
| 2013/0318603 | A1 | 11/2013 | Merza et al. | |
| 2013/0326620 | A1 | 12/2013 | Merza et al. | |
| 2013/0346988 | A1 * | 12/2013 | Bruno et al. ................... | 718/102 |
| 2014/0059017 | A1 * | 2/2014 | Chaney et al. ................ | 707/692 |
| 2014/0160238 | A1 | 6/2014 | Yim et al. | |
| 2014/0236889 | A1 | 8/2014 | Vasan et al. | |
| 2014/0236890 | A1 | 8/2014 | Vasan et al. | |

OTHER PUBLICATIONS

Computer Dictionary, 1997, Microsoft Press, Third Edition, p. 420.*

(Continued)

*Primary Examiner* — Marc Duncan
(74) *Attorney, Agent, or Firm* — Lowenstein Sandler LLP

(57) ABSTRACT

A high availability scheduler of tasks in a cluster of server devices is provided. A server device of the cluster of server devices enters a leader state based upon the results of a consensus election process in which the server device participates with others of the cluster of server devices. Upon entering the leader state, the server device schedules one or more tasks by assigning each of the one or more tasks to a server device in the cluster.

30 Claims, 16 Drawing Sheets

(56) References Cited

OTHER PUBLICATIONS

Diego Ongaro et al., "In Search of Understandable Consensus Algorithm (Extended Version)," Stanford University, 2014, pp. 1-18.

David Carasso, "Exploring Splunk Search Processing Language (SPL) Primer and Cookbook," CITO Research, 2012, 156 pages, Splunk Inc., United States of America.

Ledion Bitincka et al., "Optimizing Data Analysis with a Semi-structured Time Series Database," SLAML, 2010, 9 pages.

http://docs.splunk.com/Documentation/PCI/2.1.1/[000119]User/IncidentReviewdashboard, 2 pages, last accessed Aug. 5, 2014.

U.S. Appl. No. 14/167,316, filed Jan. 29, 2014.

"vSphere Monitoring and Performance," VMware, Inc., Update 1, vSphere 5.5, EN-001357-02, 2010-2014, pp. 1-174, http:///pubs.vmware.com/vsphere-55/topic/com.vmware.ICbase/PDF/vsphere-esxi-vcenter-server-551- monitoring-performance-guide.pdf.

U.S. Appl. No. 14/448,995, filed Jul. 31, 2014.

\* cited by examiner

Original Search: 801
search "error | stats count BY host

Sent to peers: 802
search "error | prestats count BY host (map)

Executed by search head: 803
Merge prestats results received from peers (reduce)

HIGH AVAILABILITY SCHEDULER

TECHNICAL FIELD

The present disclosure relates to a scheduler and, more particularly, to a high availability scheduler in a distributed system.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure will be understood more fully from the detailed description given below and from the accompanying drawings of various implementations of the disclosure.

FIG. 8 illustrates an exemplary search query received from a client and executed by search peers in accordance with the disclosed embodiments.

FIG. 9B illustrates a data summary dialog that enables a user to select various data sources in accordance with the disclosed embodiments.

DETAILED DESCRIPTION

Figure 1A:
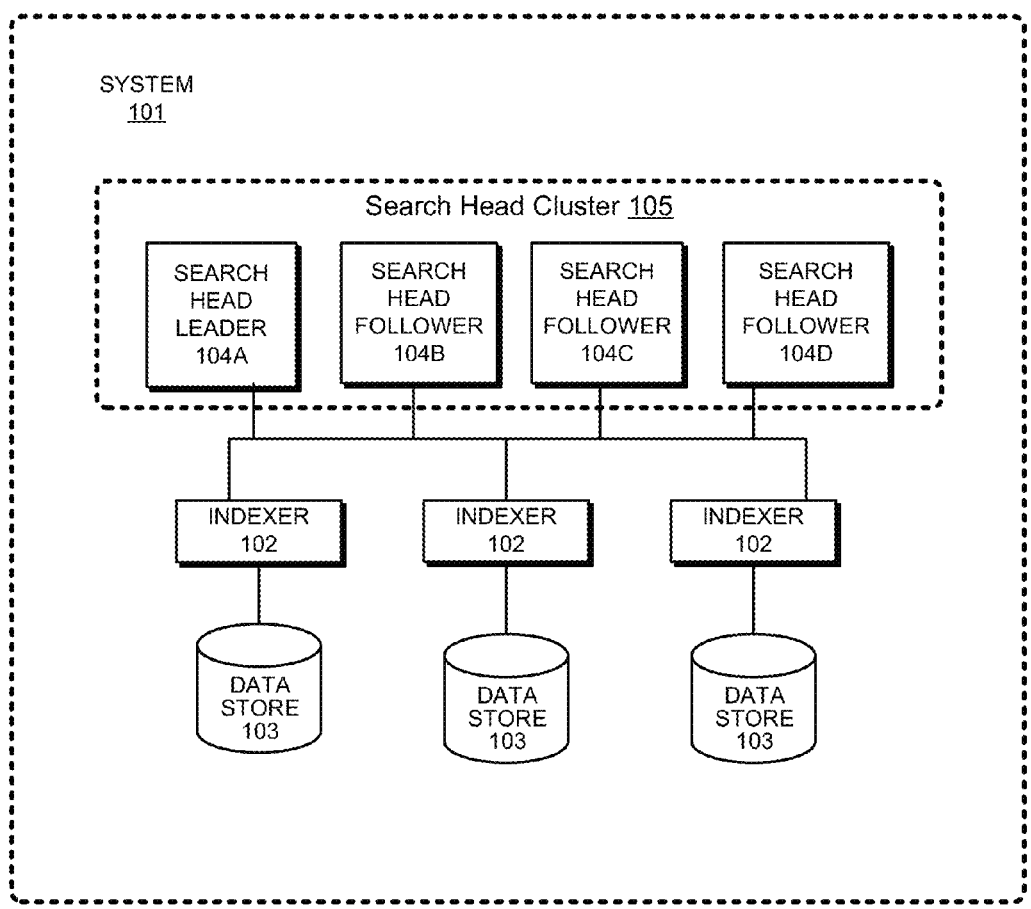
FIG. 1A presents a block diagram of an event-processing system for scheduling searches in a search head cluster, in accordance with the disclosed embodiments.

The present disclosure is directed to a high availability scheduler in a distributed system. The distributed system may include a cluster of server devices that operate to elect one of the server devices as a leader that operates as a scheduler to schedule tasks to be performed by the various server devices. When the server device elected as the leader fails, the remaining server devices in the cluster elect a new leader to operate as a scheduler in the distributed system.

An example of a distributed system is a data aggregation and analysis system that aggregates heterogeneous machine-generated data received from various sources, including servers, databases, applications, networks, etc. The aggregated source data may comprise a plurality of events. An event may be represented by a data structure that is associated with a certain point in time and comprises a portion of raw machine data (i.e., machine-generated data). The system may be configured to perform real-time indexing of the source data and to execute real-time, scheduled, or historic searches on the source data. A search query may comprise one or more search terms specifying the search criteria. Search terms may include keywords, phrases, Boolean expressions, regular expressions, field names, name-value pairs, etc. The search criteria may comprise a filter specifying relative or absolute time values, to limit the scope of the search by a specific time value or a specific time range.

A flexible schema to specify how to extract information from the event data may be used, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

The example data aggregation and analysis system executing a search query may evaluate the data relative to the search criteria to produce a search result, and the execution of the search query may involve both identifying portions of data satisfying the search criteria and, optionally, further processing the retrieved data, such as by determining aggregates on it or calculating statistics on it or extracting values for performance measurement from it. The search result may be stored on a local disk of the search head that executed the search query. The search result may also be referred to as, an artifact, a search directory (e.g., referring to the location where the search result is stored), a dispatch directory (e.g., referring to the location where the search result is stored), a resulting dataset, or a search identifier (ID) (e.g., referring to the identifier of the search result), to name a few examples.

The example data aggregation and analysis system may be employed to schedule searches to be performed by search heads of a search head cluster implemented by the data aggregation and analysis system associated with a distributed computer system (e.g., an enterprise system comprising a plurality of computer systems and peripheral devices interconnected by a plurality of networks). The search head cluster may include one or more search heads of a data aggregation and analysis system grouped together to form a cluster. A search head may refer to a component of the data aggregation and analysis system that is configured to enable it to perform a reduce phase of a map-reduce search performed by the data aggregation and analysis system, as further described below. A search head may communicate with one or more indexers that are configured to enable it for perform a map phase of the map-reduce search, as further described below.

Users may instruct the data aggregation and analysis system to perform tasks according to a schedule, e.g., to run a particular search every hour or every morning at 9 am. Thus, one of the search heads may perform the functions of a scheduler by receiving instructions to coordinate the execution of tasks according to a schedule and ensuring that the tasks are performed according to that schedule.

If the search head performing the functions of a scheduler fails, it may be unable to perform tasks according to the schedule or instruct other search heads to perform the tasks according to the schedule. Accordingly, implementations of the disclosure provide an effective mechanism for providing a high availability scheduler of searches for a data aggregation and analysis system by electing a new search head as a leader to operate as a scheduler when the current leader/scheduler fails. Thus, searches may continue to be performed according to the schedule even when a search head having scheduler duties fails, as another search head may assume the scheduler duties according to the disclosed methods herein. Similarly, implementations of the disclosure provide an efficient mechanism for providing a high availability scheduler, generally, of tasks to be performed by various servers in a cluster of servers, not just search tasks.

Generally, a scheduler may assign tasks among the machines in a distributed system using load balancing techniques. A highly available scheduler according to embodiments of the present disclosure may do that as well.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1A presents a block diagram of an exemplary event-processing system 101 (e.g., a data aggregation and analysis system) (hereinafter referred to as "system 101") for scheduling searches in a search head cluster, in accordance with one or more aspects of the present disclosure. In one implementation, system 101 is similar to the SPLUNK® ENTERPRISE system produced by Splunk Inc. of San Francisco, Calif., which is described in additional detail below.

System 101 includes one or more indexers 102 that store, process, and/or perform operations on data obtained from a variety of different sources, wherein each indexer operates on data contained in a specific data store 103. These indexers 102 can comprise separate computer systems in a distributed computer environment, or they may alternatively comprise separate processes executing on various computer systems in a distributed computer environment.

During operation, the indexers 102 receive the collected data, which is distributed across different indexers to facilitate parallel processing. This parallel processing can take place at data ingestion time, because multiple indexers 102 can process the incoming data in parallel. The parallel processing can also take place at search time, because multiple indexers 102 can search through different portions of the data in parallel.

Each indexer 102 may be responsible for storing and searching a different portion of all of the events in the system; the portion of events that an indexer 102 may have responsibility for storing and searching may optionally be stored in a corresponding data store 103 to which only that indexer has access. As discussed in more detail below, an "event" may comprise a collection of performance data and/or diagnostic information that is generated by a computer system and is correlated with a specific point in time. By distributing events among the indexers 102 and data stores 103, the indexers 102 can analyze events for a query in parallel, for example using map-reduce techniques, wherein each indexer 102 returns partial responses for a subset of events to a search head 104A-104D that combines the results to produce an answer for the query. By storing events in buckets for specific time ranges, an indexer 102 may further optimize searching by looking only in buckets for time ranges that are relevant to a query.

The indexers 102 may be communicably coupled to one or more search heads 104A-104D of a search head cluster 105. A search head 104A-104D may comprise a server device accessible by a number of client devices (not shown) over a network. The search head 104A-104D is a component that is responsible for receiving and processing a search query. The search query may be sent from a client (e.g., a browser communicating with system 101). The search head 104A-104D may analyze the received search query and determine which portions of the query may be delegated to indexers 102 and what portions should be executed locally by the search head 104A-104D. The search head 104A-104D may be responsible for a reduce phase of a map-reduce search by combining partial results and/or event received from indexers 102 to produce a final search result for the query. This final search result can comprise different types of data depending on what the query is asking for. Further details on the responsibilities and operations of search head 104A-104D are discussed below.

In some implementations, the system 101 may horizontally scale the search capability (e.g., increase the number of searches than can be run) of system 101 by creating a pool of search heads 104A-104D referred to as a search head cluster 105. Within the search head cluster 105, each search head 104A-104D is communicably coupled to each indexer 102. The search heads 104A-104D may be located at one or more sites, each site being remote from the other site, e.g., in different geographic locations. In one embodiment, all of the search heads 104A-104D of the search head cluster 105 are located at a single site. In another embodiment, at least two of the search heads 104A-104D are located at a single site and at least one other of the search heads 104A-104D is located at a different site. In another embodiment, each search head 104A-104D is located at a different site.

It may be advantageous for the search heads 104A-104D to interact with each other as a single server cluster, referred to as the search head cluster 105. At a search head cluster 105, instructions to perform a search received by one of the search heads 104A-104D may be performed by any of the search heads 104A-104D according to the load on each of the search heads 104A-104D. Generically, in a distributed system such as the system 100 of FIG. 1B described below, it may be advantageous for multiple servers to communicate with each other as a cluster such that instructions to perform a task received by one of the servers may be performed by any of the servers. In some embodiments, a scheduler may be assigned the responsibility to make task assignments in a distributed machine environment.

Figure 1B:
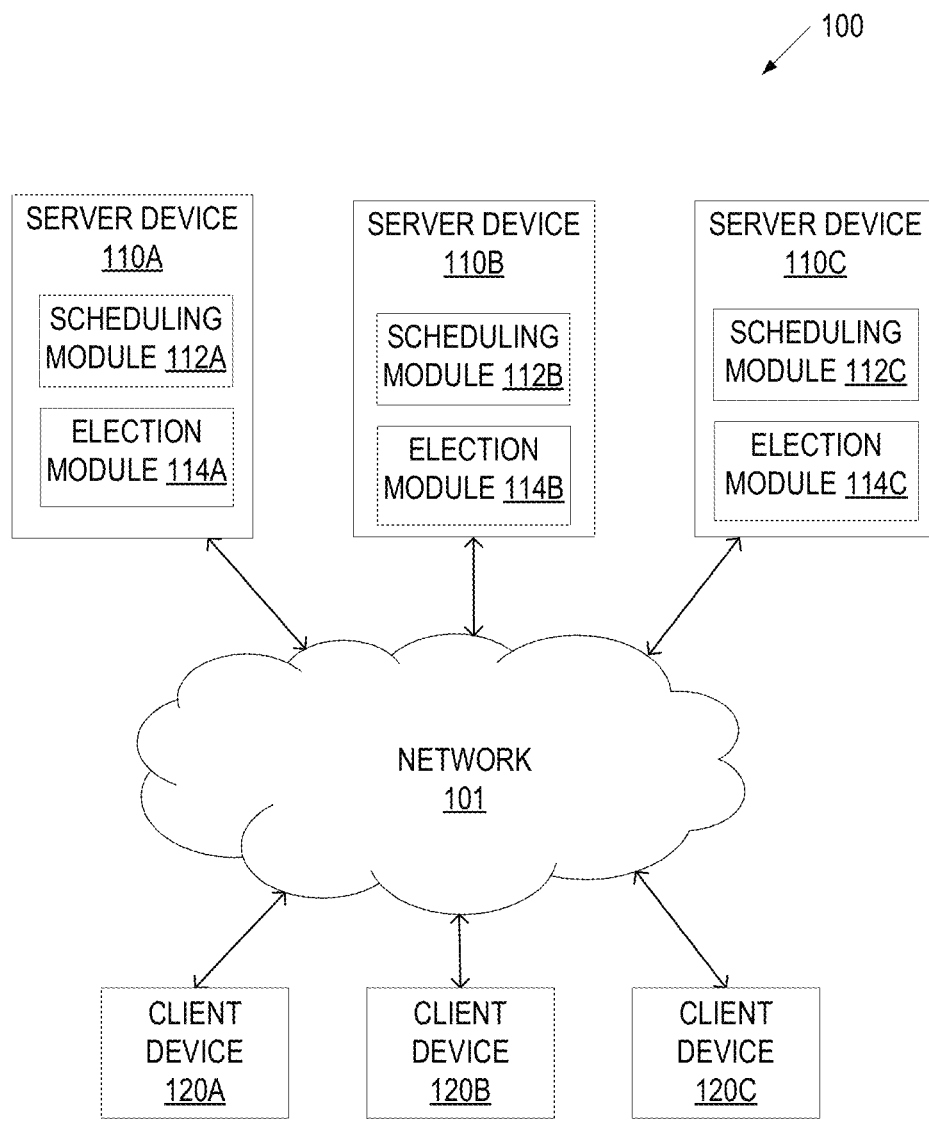
FIG. 1B presents a block diagram of a distributed system.

FIG. 1B presents a block diagram of a distributed system 100. The system 100 includes a number of server devices 110A-110C accessible by a number of client devices 120A-120C over a network 101. The server devices 110A-110C may communicate with each other via at least a portion of the network 101 or via a separate network. Although FIG. 1B illustrates three server devices 110A-110C and three client devices 120A-120C, it is to be appreciated that the system 100 may include any number of server devices 110A-110C and any number of client devices 120A-120C. In particular, the system 100 may include one, two, three, or more than three server devices 110A-110C and include one, two, three, or more than three client devices 120A-120C. The server devices 110A-110C may perform the functions of a search head, such as the search heads 104A-104D of FIG. 1A. In particular, the server devices 110A-110C may be responsible for a reduce phase of a map-reduce search performed by the system, as further described below. Each of the server devices 110A-110C may communicate with one or more indexers that are responsible for a map phase of the map-reduce search, as further described below.

The server devices 110A-110C may be located at one or more sites, each site being remote from the other site, e.g., in different geographical locations, such as different cities or states. In one embodiment, all of the server devices 110A-110C are located at a single site. In another embodiment, at least two of the server devices 110A-110B are located at a single site and at least one other of the server devices 110C is located at a different site. In another embodiment, each server device 110A-110C is located at a different site.

The server devices 110A-110C may receive instructions to perform tasks from the client devices 120A-120C. For example, one of the server devices 110A-110C may receive a request from one of the client devices 120A-120C to perform a search, such as a map-reduce search and/or a search using late-binding schema as described briefly above and in further detail below. In response to receiving the request to perform the search, the server device 110A-110C may perform the search (or, at least, the reduce phase of a map-reduce search).

The server devices 110A-110C may receive instructions from the client devices 120A-120C to perform tasks according to a schedule. For example, one of the server devices 110A-110C may receive a request from one of the client devices 120A-120C to perform a particular search every hour. The instruction may indicate the task to be performed and a schedule according to which the client device wishes the task to be performed. For example, the schedule may indicate that the task is to be performed every hour. As another example, the schedule may indicate that the task is to be performed at 7:00 pm every Monday-Friday. In one embodiment, the schedule may be specified using a cron expression. A typical cron expression is a string of five or six fields separated by whitespace that represents a set of times.

In some circumstances, one of the server devices 110A-110C may receive a large number of requests to perform tasks according to a schedule, while another of the server devices 110A-110C receives a small number of such requests. The server device receiving the large number of requests may be unable to perform all of the tasks according to the given scheduling instructions. Thus, it may be advantageous for the server devices 110A-110C to interact with each other as a single server cluster. As a server cluster, the instructions to perform a task received by one of the server devices 110A-110C may be performed by any of the server devices 110A-110C according to the load on each of the server devices 110A-110C. For example, it may be advantageous for a group of search heads to interact with each other as a single search head cluster such that instructions to perform a search received by one of the search heads may be performed by any of the search heads in the search head cluster.

The server cluster may be operated in a symmetric mode in which each server device 110A-110C has an equal role. Alternatively, the server cluster may be operated in an asymmetric mode in which one of the server devices 110A-110C is designated the "leader" or "captain" and has authority to issue commands to other servers (e.g., to allocate tasks, such as search tasks) and make decisions regarding the system. For example, each server device 110A-110C may forward to the leader instructions from the client devices 120A-120C to perform tasks according to a schedule. In turn, the leader may schedule the tasks to be performed by the various server devices 110A-110C by issuing commands to the various server devices 110A-110C to perform the tasks at specified times. Because, as described below, any of the server devices 110A-110C may be designated the leader, each of the server devices 110A-110C includes a scheduling module 112A-112C to schedule the tasks to be performed in case the server device 110A-110C is elected the leader. Similarly, when a search head cluster operates in an asymmetric mode, any search head in the search head cluster may be designated the leader and perform scheduling of searches in addition to performing other search head functions, such as the reduce phase of a map-reduce search.

In the asymmetric mode, each server device 110A-110C is either in a leader state, a follower state, or a candidate state. In the leader state, the server device 110A-110C acts as the leader and makes decisions regarding the cluster and issues commands to other server devices 110A-110C. In the follower state, the server device 110A-110C receives commands from the leader and attempts to follow the commands. A server device 110A-110C may enter the candidate state during a leader election process as described further below. Each of the server devices 110A-110C includes an election module 114A-114C to perform a leader election process. The leader election process may be, for example, a consensus algorithm election process such as that used in the Raft consensus algorithm. The Raft consensus protocol is further described in "In Search of Understandable Consensus Algorithm (Extended Version)" by Diego Ongaro and John Ousterhout, Stanford University, 2014, which is hereby incorporated herein by reference in its entirety for all purposes. A consensus algorithm generates a consensus in which each of the server devices 110A-110C agrees upon a single data value, e.g., the identity of a leader in a consensus algorithm election process.

During operation of the cluster, time may be partitioned into terms. During each term, the server devices 110A-110C attempt to elect a leader and, if a leader is elected, operate in the asymmetric mode. A term may begin during system initiation or when a server device 110A-110C acting as the leader fails or is otherwise non-responsive (such as a network communication failure). Because the cluster elects a new leader each term, it is possible that any of the server devices 110A-110C may be elected as the leader. Further, it is possible to elect a new leader when the current leader fails. Thus, the leadership role is highly available. Specifically, functions performed by the leader are highly available.

For example, as described above, each of the server devices 110A-110C includes a scheduling module 112A-112C, and when the corresponding server device 110A-110C serves as the leader, that scheduling module schedules tasks to be performed by all of the various distributed server devices 110A-110C. This provides a high availability scheduler, because when a scheduler fails (e.g., a server device 110A-110C acting as a scheduler by virtue of being designated the leader fails), a new scheduler quickly replaces it as scheduler (e.g., another server device 110A-110C assumes responsibility as the scheduler by virtue of being elected the leader). In a search head cluster, when the search head designated as the leader and responsible for scheduling searches fails, a different search head may be elected the leader and assume responsibility for scheduling searches among the various search heads in the cluster. Thus, the search head cluster provides a highly available scheduler of searches.

Each server device 110A-110C may store a numeric value identifying the current term (e.g., 1, 2, ... N, etc.). This current term value may be stored in non-volatile memory such that when a server device 110A-110C fails and is restarted, the server device 110A-110C may access the current term value. During each term, each server device 110A-110C may cast a single vote to elect one of the server devices 110A-110C as a leader. Thus, each server device 110A-110C may store, along with the current term value, an identifier of a server device 110A-110C for which the server device 110A-110C has voted to be a leader during the current term. The identifier may be stored in association with the current term value in non-volatile memory.

Figure 2:
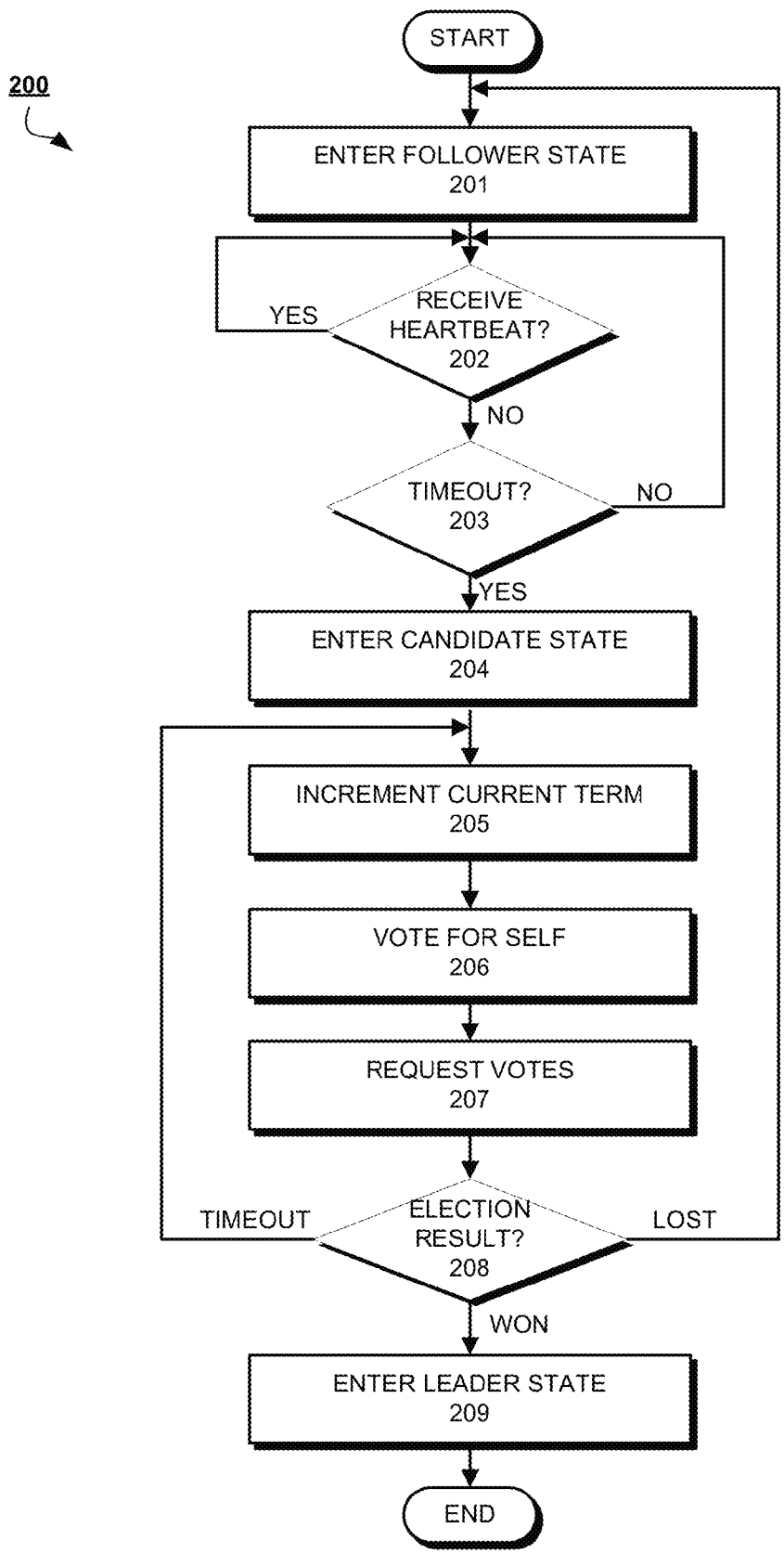
FIG. 2 presents a flowchart illustrating how a server device operates in a cluster to elect a leader.

FIG. 2 presents a flowchart illustrating how a server device 110A-110C operates in a cluster to elect a leader. The method 200 of FIG. 2 may be used as part of a Raft algorithm for providing a consensus election process. When a server device 110A-110C is initialized, the server device 110A-110C starts in the follower state in block 201 of method 200. The server device 110A-110C may be initialized when the cluster is initialized. The server device 110A-110C may also be initialized because it has joined an existing cluster or it failed and has been restarted. If a leader has been elected, the leader sends out periodic heartbeat messages to maintain its authority. The heartbeat messages may be transmitted approximately every 150 milliseconds. The heartbeat messages serve to inform the other server devices 110A-110C that the leader is operational. Accordingly, heartbeat messages may, in some circumstances, not be sent to a server device 110A-110C if the leader is sending other messages to the server device 110A-110C as these other messages serve to inform the server device 110A-110C that the leader is operational.

Thus, in the follower state, the server device 110A-110C expects to receive heartbeat messages from a leader on a periodic basis. In response to receiving such a heartbeat message, the server device 110A-110C may respond by sending heartbeat acknowledgment signal back to the leader. However, if a period of time passes without the server device 110A-110C receiving a heartbeat message from a leader, referred to as a heartbeat timeout, the server device 110A-110C may begin an election process (e.g., using election module 114A-114C) to elect a new leader. Thus, at block 202, the server device 110A-110C determines whether a heartbeat message has been received. If a heartbeat message has been received, the server device 110A-110C returns to block 202 to await another heartbeat message. If a heartbeat message has not been received, the server device 110A-110C continues to block 203 where it determines whether a heartbeat timeout has occurred. The heartbeat timeout period of time may be randomly selected by the server device 110A-110C between a first value and a second value. For example, the heartbeat timeout period of time may be selected by the server device 110A-110C as any value between 100 and 500 milliseconds. By randomly selecting a heartbeat timeout period of time, each server device 110A-110C decides to begin the election process at a different time, preventing all of the server devices 110A-110C from simultaneously transitioning to candidate state and requesting votes (as described below).

If the server device 110A-110C determines, at block 203, that a heartbeat timeout has not occurred, the server device 110A-110C returns to block 202 and awaits a heartbeat message. If the server device 110A-110C determines that a heartbeat timeout has occurred, the server device 110A-110C continues to block 204 where it enters the candidate state.

Once in the candidate state, the server device 110A-110C increments (e.g., by 1) the current term value stored in memory (at block 205), votes for itself (at block 206), and requests votes from the other server devices 110A-110C in the cluster (at block 207). The server device 110A-110C may vote for itself by associating its own identifier with the updated current term value in non-volatile memory. The server device 110A-110C may request votes from the other server devices 110A-110C by transmitting messages to the other server devices 110A-110C including, among other things, the incremented current term value and the identifier of the requesting server device.

Each server device 110A-110C, upon receiving a request for a vote, may respond to the requesting server device 110A-110C. If the receiving server device 110A-110C has not already voted for another server device 110A-110C in the term indicated by the request, the receiving server device 110A-110C may vote for the requesting server device 110A-110C by storing the requesting server device's identifier in memory in association with the term value and sending a response to the requesting server device 110A-110C indicating that the receiving server device 110A-110C has cast its vote for the requesting server device 110A-110C. If the receiving server device 110A-110C has already voted for another server, as indicated by another server device's identifier stored in the receiving server device's memory in association with the term value that matches the term value in the request, the server device 110A-110C may send a response to the requesting server indicating that the request is denied.

At block 208, the server device 110A-110C determines the election results. If the server device 110A-110C receives a majority of votes, the election is won and the server continues to block 209 where it enters into the leader state. The server device 110A-110C may determine that it has received a majority of the votes when the number of responses from other server devices 110A-110C indicating that they have voted for the server device 110A-110C (plus one for its own vote for itself) is greater than half the number of server devices 110A-110C in the cluster. Once in the leader state, the server device 110A-110C sends out heartbeat messages to the other server devices 110A-110C, thereby indicating that it has taken on the leadership role. The other server devices 110A-110C may respond by sending heartbeat acknowledgment signals back to the leader. In one embodiment, if the leader does not receive heartbeat acknowledgment signals from at least a majority of the server devices 110A-110C in the cluster, the server device 110A-110C abdicates its leadership role by transitioning to the follower state, returning to block 201. Thus, the server device 110A-110C may continue participation in the consensus election process after entering the leader state (at block 209) to enable another server device 110A-110C in the plurality of server devices 110A-110C to assume scheduling responsibilities in the case of computer or network breakdown affecting the server device 110A-110C.

If, at block 208, the server device 110A-110C receives a heartbeat message from another server device 110A-110C indicating that the other server has transitioned to the leader state, the election is lost and the server device 110A-110C returns to block 201 where it enters into the follower state.

If, at block 208, a period of time elapses without the server device 110A-110C receiving a majority of votes or receiving a heartbeat message indicating that another server device 110A-110C has become the leader, referred to as an election timeout, the server device 110A-110C returns to block 205 where another term is begun and the election process begins again. An election timeout may occur when multiple servers have transitioned to the candidate state and votes are split such that none of the servers receives a majority of the votes. The election timeout period of time may be the same as the heartbeat timeout period of time or a different value. In one embodiment, the election timeout period of time is randomly selected between 100 and 500 milliseconds.

As described above, because the leader can change between terms, the leadership role is highly available. Because each of the server devices 110A-110C includes a scheduling module 112A-112C that schedules tasks among the server devices 110A-110C when and only when the corresponding server device 110A-110C that contains it serves as the leader, high availability has been created for the scheduling role. Similarly, in a search head cluster, each search head includes a scheduling module to be able to perform scheduling functionality for searches any time the search head is designated the leader, thereby providing a high availability scheduler for searches within the search head cluster.

Figure 3:
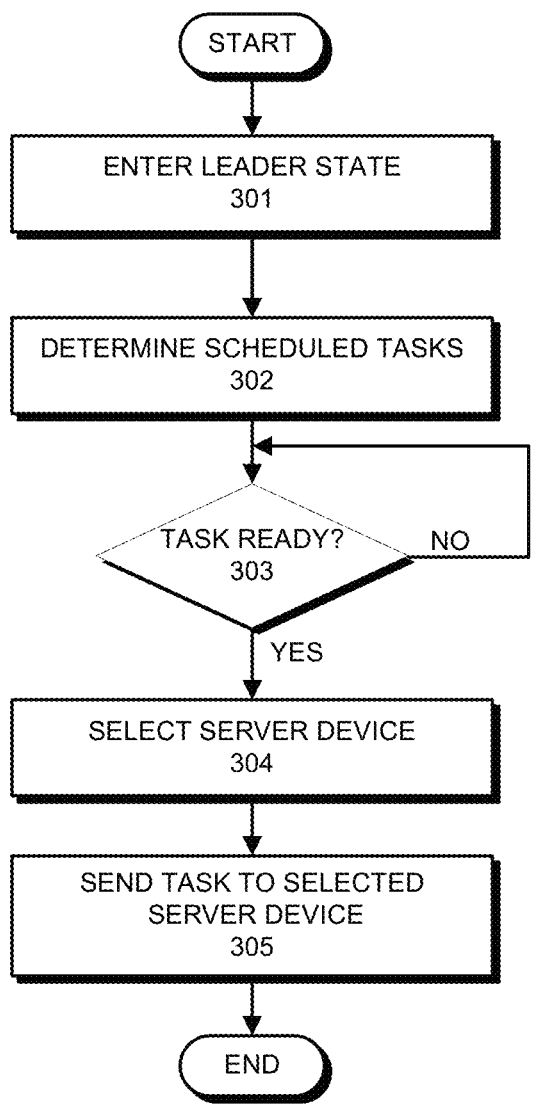
FIG. 3 presents a flowchart illustrating how a server device operates to schedule tasks in a cluster.

FIG. 3 presents a flowchart illustrating how a server device 110A-110C may operate to schedule tasks in a cluster. As noted above, the server device 110A-110C may operate as a search head, such as the search head 104A-104D of FIG. 1A. Thus, the method 300 of FIG. 3 may be used to schedule searches. (It should be recognized that the term "schedule" is being used in two different senses in the following example: the search itself may be scheduled to run at specific times, but it can be run on any of the servers at that time; the assignment of the task of running the search at that time to a specific server is referred to as "scheduling" the search and is performed by a leader who has assumed responsibility as the "scheduler.")

The server device 110A-110C enters the leader state in block 301 of method 300. The server device 110A-110C may enter the leader state by winning a consensus election as described above (e.g., a Raft consensus election process) or by any other method. In particular, the server device 110A-110C may enter the leader state based upon a result of a consensus election process in which the server device participates with a plurality of server devices 110A-110C. As described below, based on being in the leader state, the server device 110A-110C may schedule one or more tasks by assigning each of the one or more tasks to a server device 110A-110C in the plurality of server devices 110A-110C. The one or more tasks may include, for example, the initiation of a schedule search at a particular time.

At block 302, the server device 110A-110C determines one or more scheduled tasks to be performed. The server device 110A-110C may receive instructions to perform a task according to a schedule directly from a client device 120A-120C or via another of the server devices 110A-110C. In one embodiment, the server device 110A-110C determines one or more scheduled tasks by accessing a configuration file storing information regarding instructions received by the cluster from the client devices 120A-120C. In one embodiment, the scheduled tasks are search tasks, and the configuration file stores information regarding the scheduled searches to be performed.

When a server device 110A-110C receives from a client device 120A-120C instructions to perform a task according to a schedule, the server device 110A-110C may write the information in the instructions to a locally stored configuration file and propagate the updated configuration file to all of the other server devices 110A-110C in the cluster, including the leader. By propagating the updated configuration file to server devices 110A-110C other than the leader, the server device 110A-110C acting as the current leader enables any other server device 110A-110C in the cluster, upon subsequently being elected as the leader should the current leader fail, to perform the assignment of tasks (scheduling).

At block 303, the server device 110A-110C acting as the leader determines when a task is ready to be performed according to its schedule. For example, the server device 110A-110C may determine that a task that is to be performed every hour is ready to be performed an hour after the last performance of the task.

At block 304, the leader server device 110A-110C determines which server device 110A-110C of the cluster should perform the task. The leader may select the server device 110A-110C of the cluster based on respective scheduled loads of the server devices 110A-110C. The scheduled load for a server device 110A-110C may be determined as a weighted average of the number of scheduled tasks assigned to that server device 110A-110C by the leader. For example, the scheduled load may be determined as the sum of (1) a first value multiplied by the number of tasks assigned within the last minute, (2) a second value multiplied by the number of tasks assigned in the last five minutes, and (3) a third value multiplied by the number of tasks assigned in the last fifteen minutes.

The leader may select the server device 110A-110C of the cluster based on a size of the assigned jobs. For example, if the leader assigns a large job (as determined based on an expected amount of time or processing cycles to complete the job) to a particular server device 110A-110C, the leader may assign fewer scheduled tasks to that server device 110A-110C.

The leader may select the server device 110A-110C of the cluster based on the number of processing slots of the server device 110A-110C. For example, if one of the server devices 110A-110C has a large number of processing slots as compared to the other server devices 110A-110C, that server device 110A-110C may be assigned more scheduled tasks by the leader.

In some circumstances, the leader may select itself as the server device 110A-110C to perform the scheduled task. For example, in a search head cluster, the leader may, itself, be a search head responsible for performing the reduce phase of a map reduce search. Thus, the leader may select itself as the search head to perform the scheduled task (e.g., a scheduled search). The leader may consider its own processing availability in making such a selection.

Once a server device 110A-110C is selected at block 304, the leader assigns and sends the task to the selected server device 110A-110C at block 305 (i.e., schedules the task). If the leader selects itself as the server device 110A-110C to perform the task, it performs the scheduled task without sending it to another server device 110A-110C.

The leader may send a command to the selected server device 110A-110C to perform the scheduled task. The command may include the instructions to perform the task and a nonce or one-time signature to uniqify (or "instantiate" or "individualize") each instance of the task. Thus, if a task having a task identifier is to be performed multiple times according to a schedule (e.g., every day), each instance of the task and the results of each instance of the task can be uniquely identified. For example, if a task with a task identifier of "stats_count_clientip" is to be performed every hour, the leader may send a command to perform "stats_count_clientip" to the selected server device 110A-110C with a nonce of "1BGS3", and an hour later, send a command to perform "stats_count_clientip" to the selected server device 110A-110C (or another server device 110A-110C) with a different nonce, e.g., a nonce of "HPO2X". The nonce may be randomly selected or otherwise selected to avoid the likelihood of repeated use of the same nonce.

The selected server device 110A-110C can perform the task in response to the command and return to the leader a confirmation that the task was performed including the nonce and the location in storage of the results of the task. For example, in the search head cluster, if the task is a search, the selected search head may return a confirmation including the nonce and the location of the search result or artifact (e.g., in local storage of the selected search head). The selected server device 110A-110C may determine the instructions to perform the commanded task by accessing the configuration file described above. The configuration file may include a number of stanzas, each of the stanzas including a task identifier (e.g., a name for the task) and information describing the task to be performed (and, optionally, a schedule for performing the task). For example, the configuration file may include a search entitled "unique_ip" that includes instructions to search data to determine a number of unique IP addresses that have accessed a particular resource each day.

One or more of the selected server devices 110A-110C may fail when scheduled tasks are being assigned. In one embodiment, when the leader sends a command to perform a task to a selected server device 110A-110C, the selected server device 110A-110C will respond with an acknowledgment that the selected server device 110A-110C is operational and will perform the task. The acknowledgment may include one or more of the task identifier, the nonce, and the location in storage of the results of the task. The acknowledgment may include other information, such as an expected time to perform the task or a current scheduled load of the server device 110A-110C. If the leader fails to receive an acknowledgment from the selected server device 110A-110C, the leader may return to block 304 and select a different server device 110A-110C to perform the task.

The selected server device 110A-110C may fail after being commanded to perform a task and after responding with an acknowledgement that it will perform the task. Thus, the leader may regularly check the status of server devices 110A-110C that have been assigned tasks, but have not returned a confirmation that the task has been completed. If a period of time passes without the leader receiving an expected confirmation message from the selected server device 110A-110C, referred to as a task timeout, the leader may return to block 304 and select a different server device 110A-110C to perform the task. The task timeout period of time may be a fixed time, e.g., 10 minutes. The task timeout period of time may be based on an expected time to perform the task received by the leader in the acknowledgement. For example, the task timeout period of time may be twice the expected time to perform the task.

In one embodiment, the selected server device 110A-110C may return a failure message before the task timeout. In response, the leader may return to block 304 and select a different server device 110A-110C to perform the task.

As noted above, when the leader fails, the cluster can elect a new leader. The new leader starts at block 301 by entering the leader state and proceeds to assign scheduled tasks to the various server devices 110A-110C in operation.

The system 100 of FIG. 1B may provide a high availability scheduler that may be used to assign (schedule) any kind of task that a computer may do to the various distributed hosts in the system, not just search (or scheduled search) tasks, and the scheduler may make these task assignments (i.e., schedule these tasks among the distributed hosts) to achieve load balancing of the work among the hosts. In one embodiment, the cluster of server devices 110A-110C performs the function of a data processing system. In various illustrative examples, the data processing system may be represented by the SPLUNK® ENTERPRISE system produced by Splunk Inc. of San Francisco, Calif., to store and process data. For example, the cluster of server devices 110A-110C may constitute a search head cluster or a search head pool, with the search heads in the search head pool initiating and running various searches (such as map-reduce searches), with the searches to be run being assigned (scheduled) as received by the various search heads in real-time or being assigned (scheduled) at times specified in a previously provided schedule for scheduled searches. An embodiment of an event-based system is described in detail below.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 4:
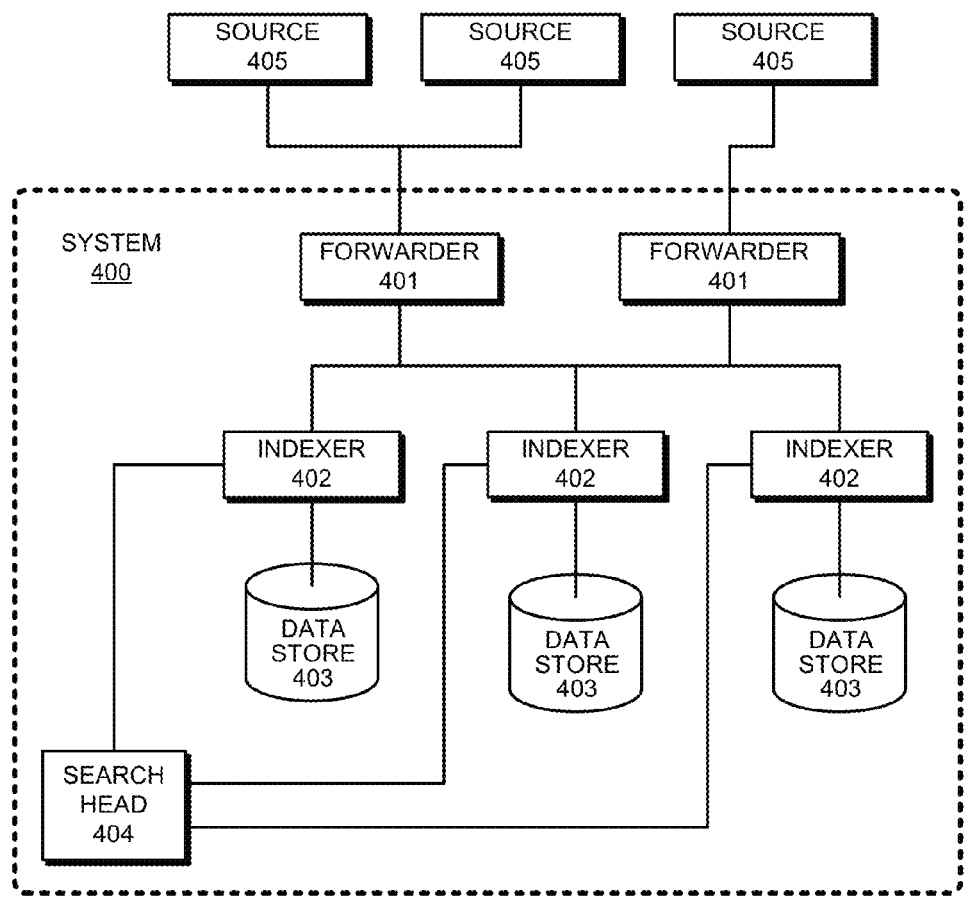
FIG. 4 presents a block diagram of an event-processing system in accordance with the disclosed embodiments.

FIG. 4 presents a block diagram of an exemplary event-processing system 400, similar to the SPLUNK® ENTERPRISE system. System 400 includes one or more forwarders 401 that collect data obtained from a variety of different data sources 405, and one or more indexers 402 that store, process, and/or perform operations on this data, wherein each indexer operates on data contained in a specific data store 403. These forwarders and indexers can comprise separate computer systems in a data center, or may alternatively comprise separate processes executing on various computer systems in a data center.

During operation, the forwarders 401 identify which indexers 402 will receive the collected data and then forward the data to the identified indexers. Forwarders 401 can also perform operations to strip out extraneous data and detect timestamps in the data. The forwarders next determine which indexers 402 will receive each data item and then forward the data items to the determined indexers 402.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

Figure 5:
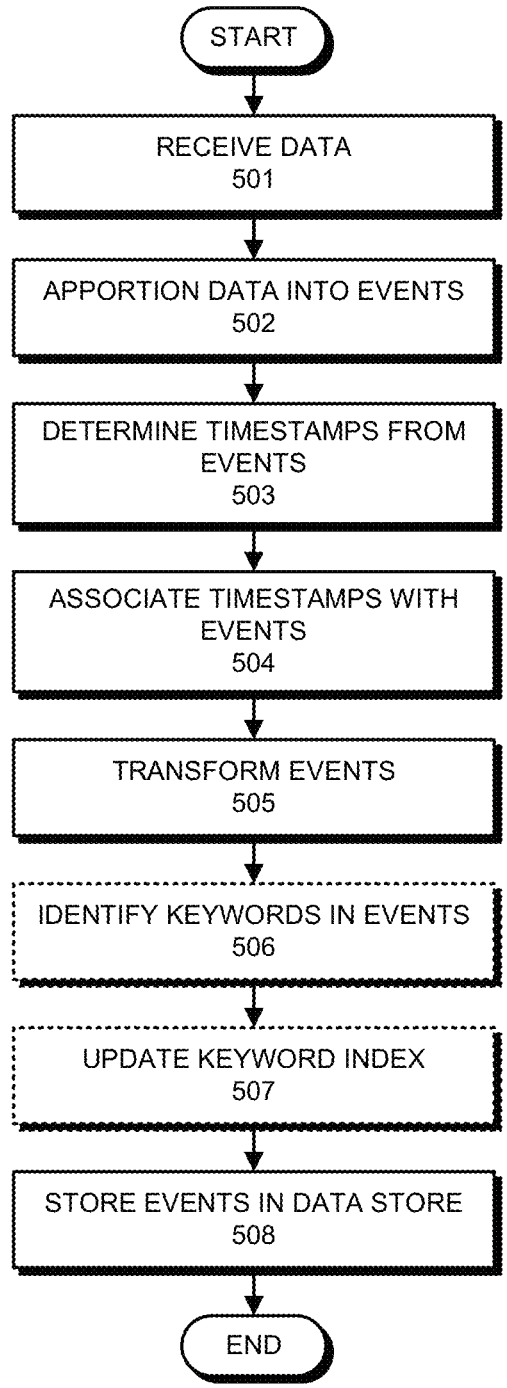
FIG. 5 presents a flowchart illustrating how indexers process, index, and store data received from forwarders in accordance with the disclosed embodiments.

System 400 and the processes described below with respect to FIGS. 4-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

FIG. 5 presents a flowchart illustrating how an indexer processes, indexes, and stores data received from forwarders in accordance with the disclosed embodiments. At block 501, the indexer receives the data from the forwarder. Next, at block 502, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 503. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 504, for example by storing the timestamp as metadata for each event.

Then, the system can apply transformations to data to be included in events at block 505. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 506. Then, at block 507 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 508, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 402 is responsible for storing and searching a subset of the events contained in a corresponding data store 403. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 6:
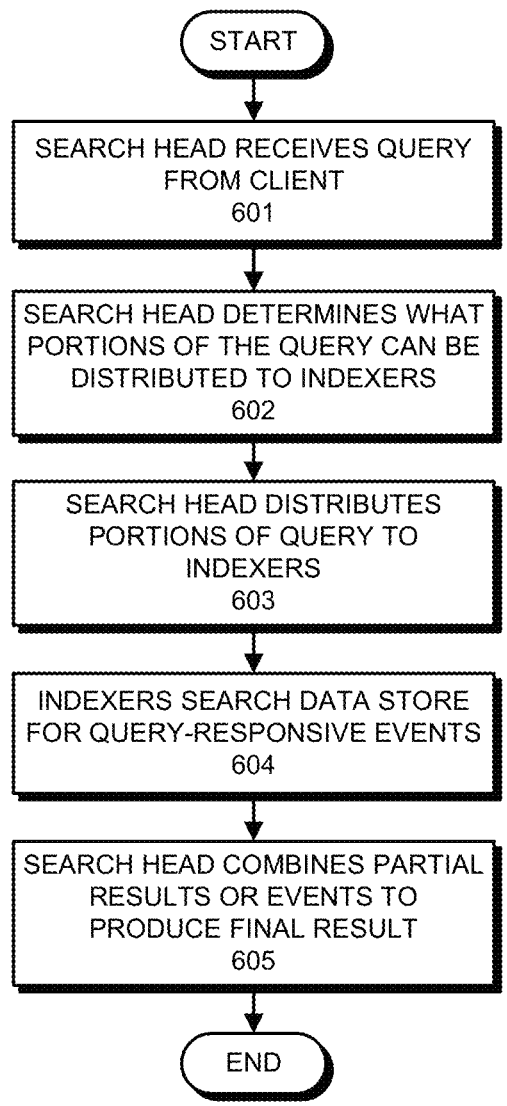
FIG. 6 presents a flowchart illustrating how a search head and indexers perform a search query in accordance with the disclosed embodiments.

FIG. 6 presents a flowchart illustrating how a search head and indexers perform a search query in accordance with the disclosed embodiments. At the start of this process, a search head receives a search query from a client at block 601. Next, at block 602, the search head analyzes the search query to determine what portions can be delegated to indexers and what portions need to be executed locally by the search head. At block 603, the search head distributes the determined portions of the query to the indexers. Note that commands that operate on single events can be trivially delegated to the indexers, while commands that involve events from multiple indexers are harder to delegate.

Then, at block 604, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 604 may involve using the late-binding scheme to extract values for specified fields from events at the time the query is processed. Next, the indexers can either send the relevant events back to the search head, or use the events to calculate a partial result, and send the partial result back to the search head.

Finally, at block 605, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 400 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 7:
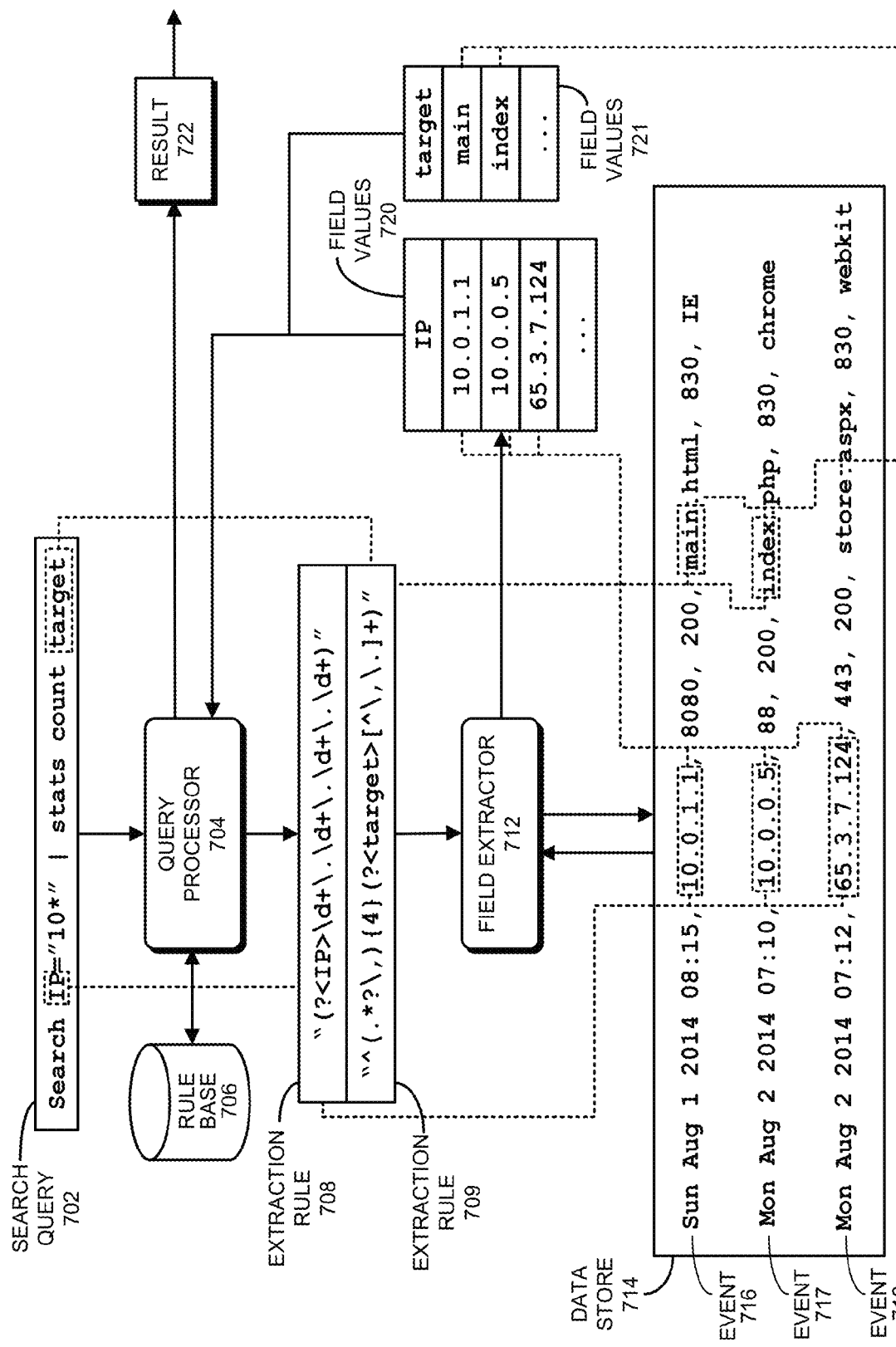
FIG. 7 presents a block diagram of a system for processing search requests that uses extraction rules for field values in accordance with the disclosed embodiments.

FIG. 7 presents a block diagram illustrating how fields can be extracted during query processing in accordance with the disclosed embodiments. At the start of this process, a search query 702 is received at a query processor 704. Query processor 704 includes various mechanisms for processing a query, wherein these mechanisms can reside in a search head 404 and/or an indexer 402. Note that the exemplary search query 702 illustrated in FIG. 7 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 702 can also be expressed in other query languages, such as the Structured Query Language ("SQL") or any suitable query language.

Upon receiving search query 702, query processor 704 sees that search query 702 includes two fields "IP" and "target." Query processor 704 also determines that the values for the "IP" and "target" fields have not already been extracted from events in data store 714, and consequently determines that query processor 704 needs to use extraction rules to extract values for the fields. Hence, query processor 704 performs a lookup for the extraction rules in a rule base 706, wherein rule base 706 maps field names to corresponding extraction rules and obtains extraction rules 708-709, wherein extraction rule 708 specifies how to extract a value for the "IP" field from an event, and extraction rule 709 specifies how to extract a value for the "target" field from an event. As is illustrated in FIG. 7, extraction rules 708-709 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 704 sends extraction rules 708-709 to a field extractor 712, which applies extraction rules 708-709 to events 716-718 in a data store 714. Note that data store 714 can include one or more data stores, and extraction rules 708-709 can be applied to large numbers of events in data store 714, and are not meant to be limited to the three events 716-718 illustrated in FIG. 7. Moreover, the query processor 704 can instruct field extractor 712 to apply the extraction rules to all the events in a data store 714, or to a subset of the events that have been filtered based on some criteria.

Next, field extractor 712 applies extraction rule 708 for the first command "Search IP="10*"" to events in data store 714 including events 716-718. Extraction rule 708 is used to extract values for the IP address field from events in data store 714 by looking for a pattern of one or more digits, followed by a period, followed again by one or more digits, followed by another period, followed again by one or more digits, followed by another period, and followed again by one or more digits. Next, field extractor 712 returns field values 720 to query processor 704, which uses the criterion IP="10*" to look for IP addresses that start with "10". Note that events 716 and 717 match this criterion, but event 718 does not, so the result set for the first command is events 716-717.

Query processor 704 then sends events 716-717 to the next command "stats count target." To process this command, query processor 704 causes field extractor 712 to apply extraction rule 709 to events 716-717. Extraction rule 709 is used to extract values for the target field for events 716-717 by skipping the first four commas in events 716-717, and then extracting all of the following characters until a comma or period is reached. Next, field extractor 712 returns field values 721 to query processor 704, which executes the command "stats count target" to count the number of unique values contained in the target fields, which in this example produces the value "2" that is returned as a final result 722 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 9A:
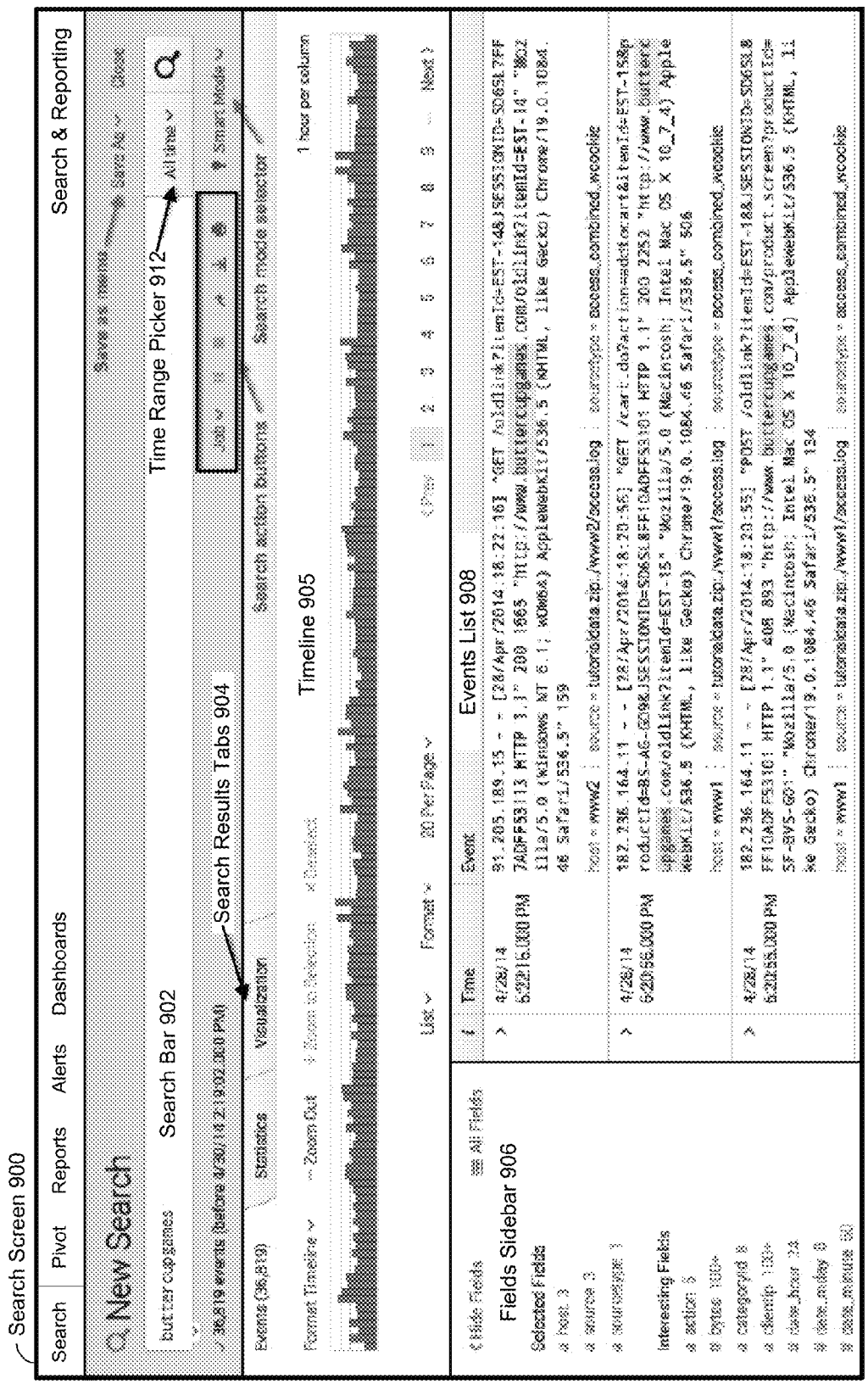
FIG. 9A illustrates a search screen in accordance with the disclosed embodiments.
Figure 9B:
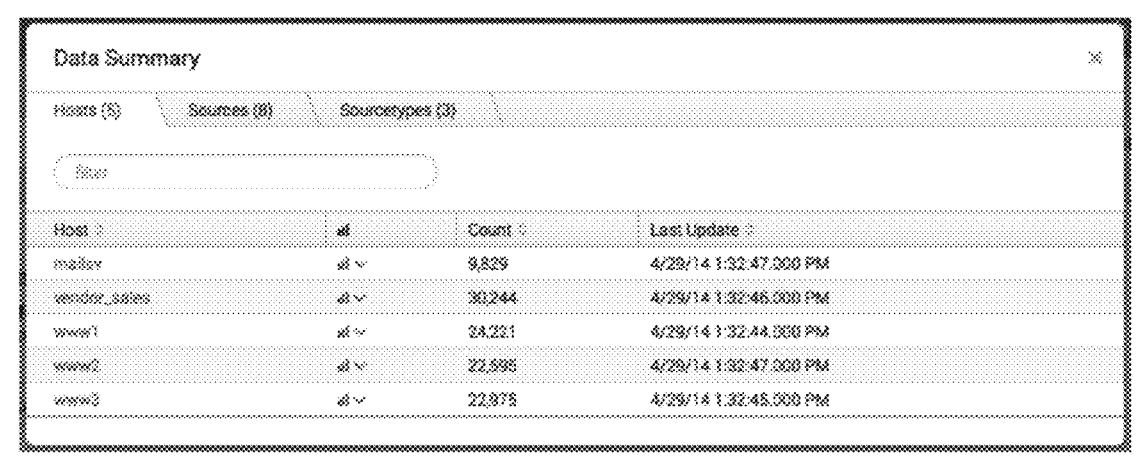

FIG. 9A illustrates an exemplary search screen 900 in accordance with the disclosed embodiments. Search screen 900 includes a search bar 902 that accepts user input in the form of a search string. It also includes a time range picker 912 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 900 also initially displays a "data summary" dialog as is illustrated in FIG. 9B that enables the user to select different sources for the event data, for example by selecting specific hosts and log files.

After the search is executed, the search screen 900 can display the results through search results tabs 904, wherein search results tabs 904 includes: an "events tab" that displays various information about events returned by the search; a "statistics tab" that displays statistics about the search results; and a "visualization tab" that displays various visualizations of the search results. The events tab illustrated in FIG. 9A displays a timeline graph 905 that graphically illustrates the number of events that occurred in one-hour intervals over the selected time range. It also displays an events list 908 that enables a user to view the raw data in each of the returned events. It additionally displays a fields sidebar 906 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 8 illustrates how a search query 801 received from a client at search head 404 can split into two phases, including: (1) a "map phase" comprising subtasks 802 (e.g., data retrieval or simple filtering) that may be performed in parallel and are "mapped" to indexers 402 for execution, and (2) a "reduce phase" comprising a merging operation 803 to be executed by the search head when the results are ultimately collected from the indexers.

During operation, upon receiving search query 801, search head 404 modifies search query 801 by substituting "stats" with "prestats" to produce search query 802, and then distributes search query 802 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 6, or may alternatively distribute a modified version (e.g., a more restricted version) of the search query to the search peers. In this example, the indexers are responsible for producing the results and sending them to the search head. After the indexers return the results to the search head, the search head performs the merging operations 803 on the results. Note that by executing the computation in this way, the system effectively distributes the computational operations while minimizing data transfers.

1.7.2 Keyword Index

As described above with reference to the flow charts in FIGS. 5 and 6, event-processing system 400 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 400 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 10A:
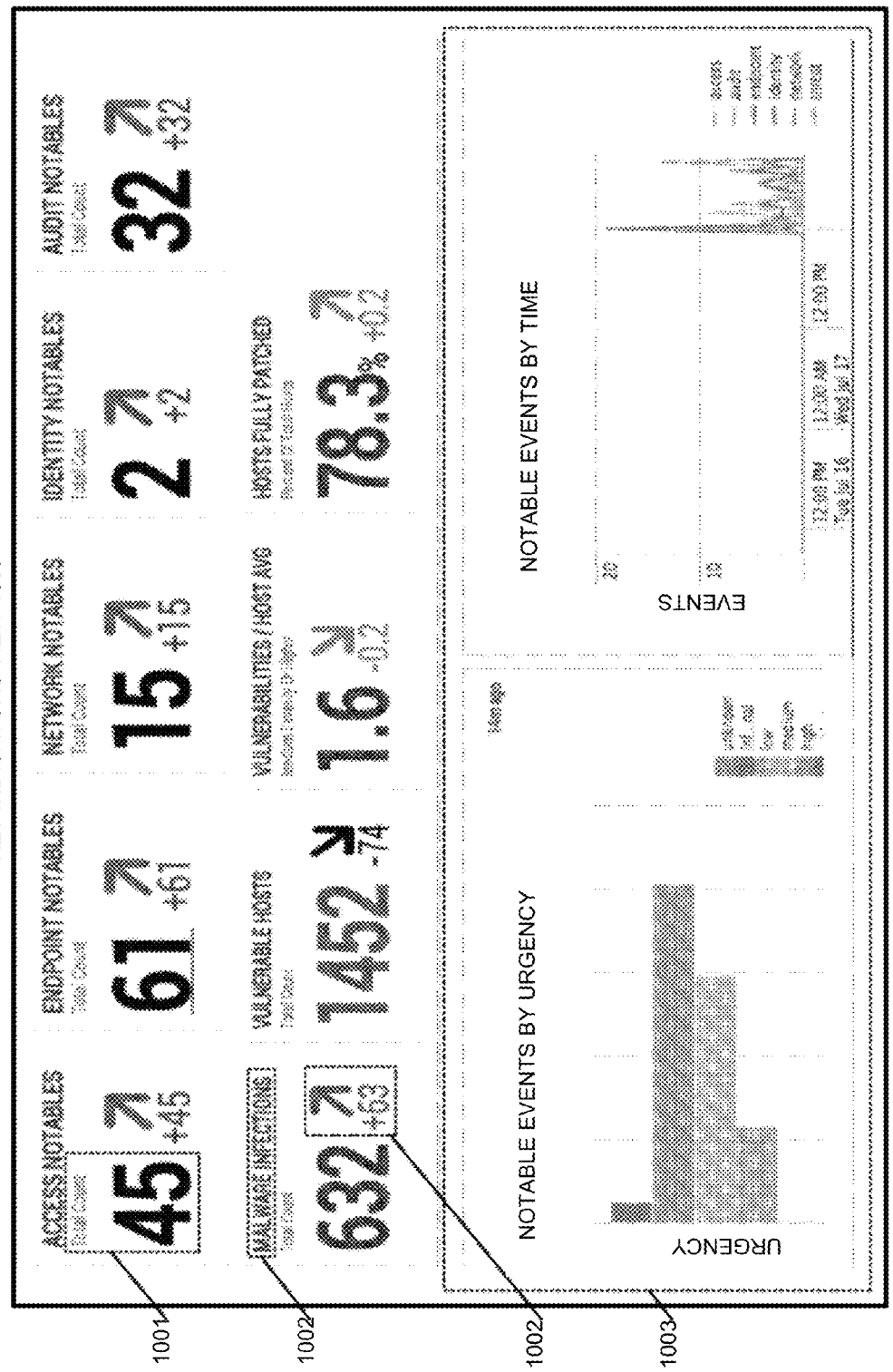
FIG. 10A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 10A illustrates an exemplary key indicators view 1000 that comprises a dashboard, which can display a value 1001, for various security-related metrics, such as malware infections 1002. It can also display a change in a metric value 1003, which indicates that the number of malware infections increased by 63 during the preceding interval. Key indicators view 1000 additionally displays a histogram panel 1004 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 10B:
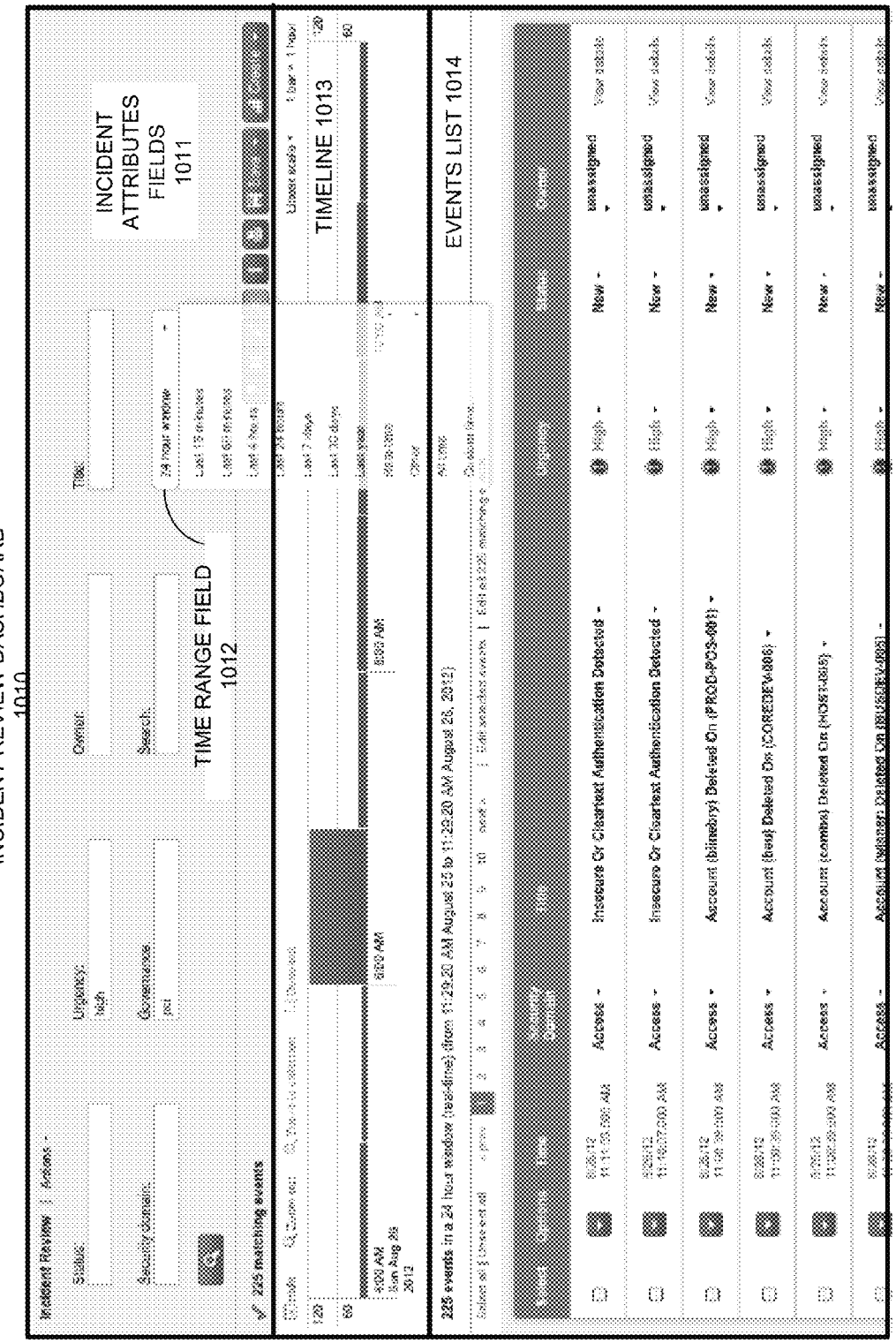
FIG. 10B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 10B illustrates an exemplary incident review dashboard 1010 that includes a set of incident attribute fields 1011 that, for example, enables a user to specify a time range field 1012 for the displayed events. It also includes a timeline 1013 that graphically illustrates the number of incidents that occurred in one-hour time intervals over the selected time range. It additionally displays an events list 1014 that enables a user to view a list of all of the notable events that match the criteria in the incident attributes fields 1011. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 10C:
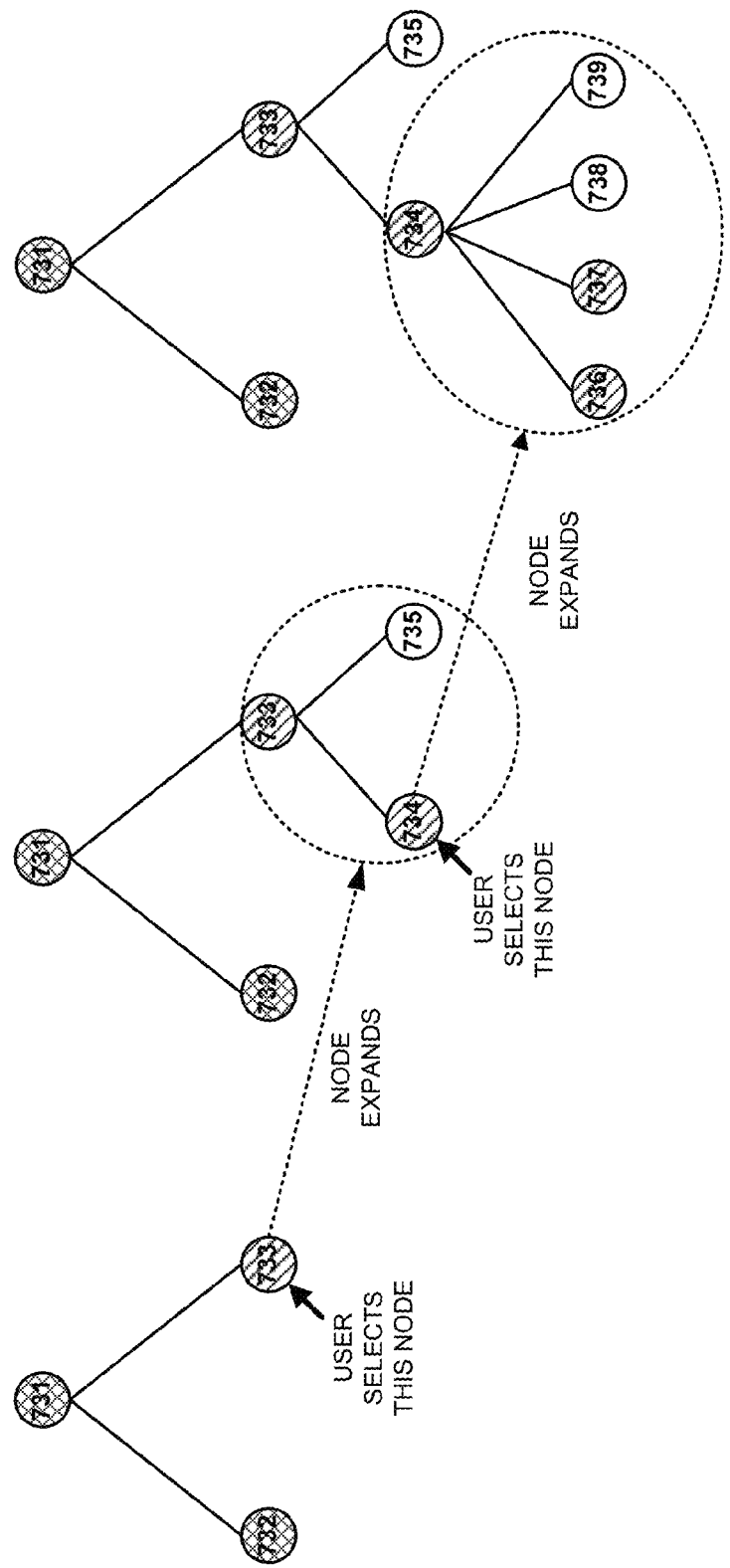
FIG. 10C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 10C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 10D:
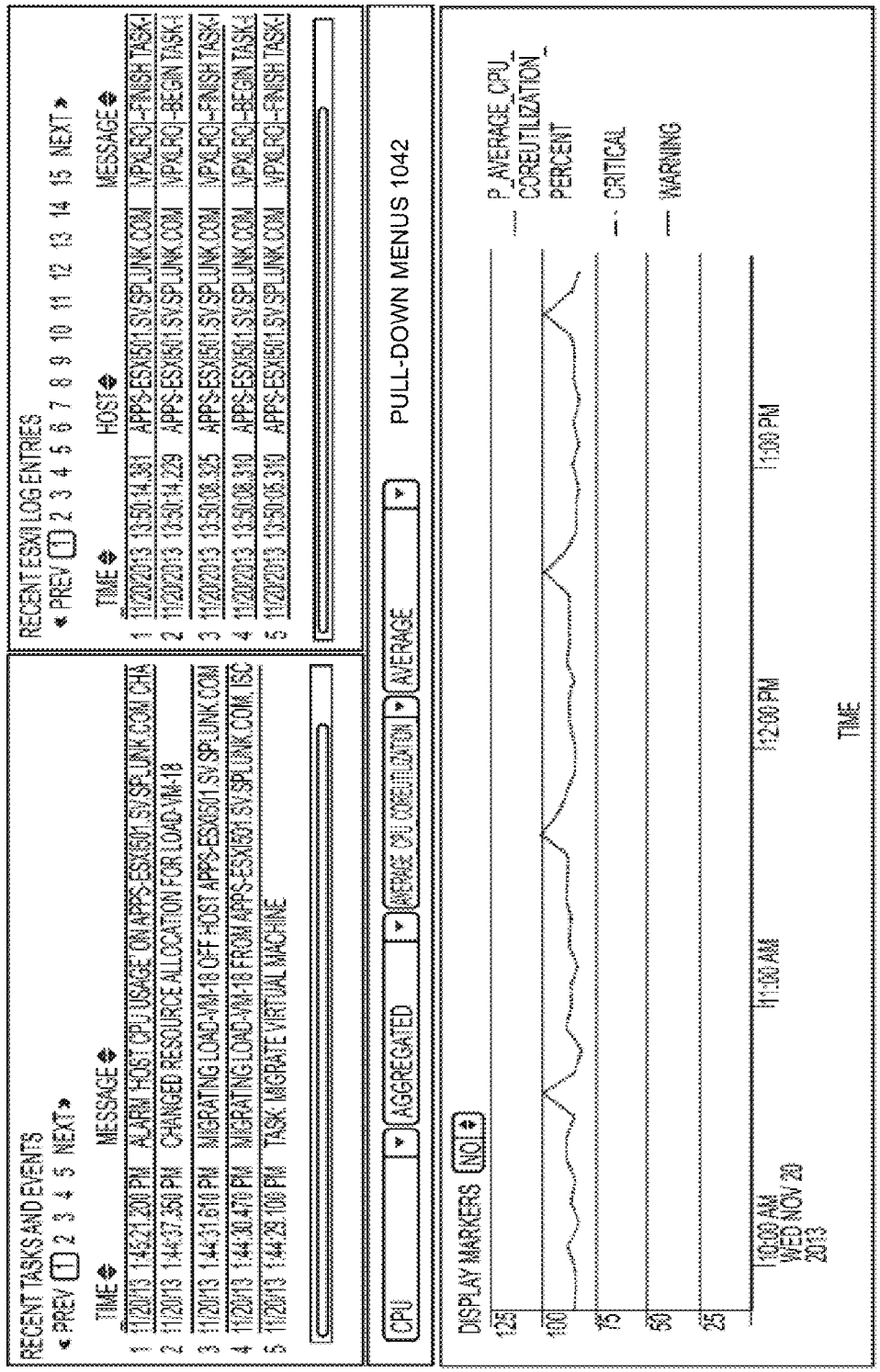
FIG. 10D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 10D displays a listing of recent "tasks and events" and a listing of recent "log entries" for a selected time range above a performance-metric graph for "average CPU core utilization" for the selected time range. Note that a user is able to operate pull-down menus 1042 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 11:
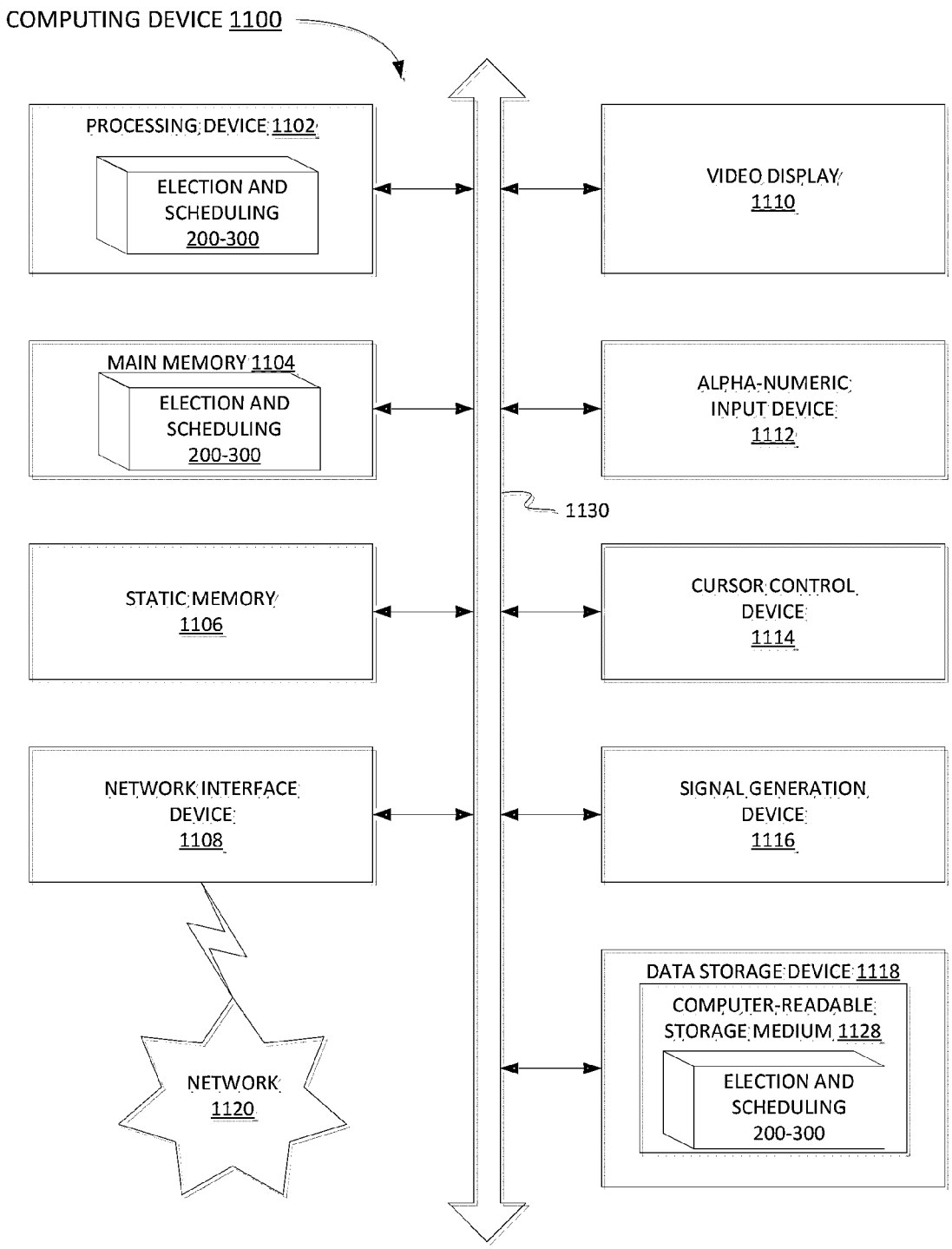
FIG. 11 depicts a block diagram of an example computing device operating in accordance with one or more aspects of the present disclosure.

FIG. 11 illustrates a diagrammatic representation of a computing device 1100 within which a set of instructions for causing the computing device to perform the methods discussed herein may be executed. The computing device 1100 may be connected to other computing devices in a LAN, an intranet, an extranet, and/or the Internet. The computing device 1100 may operate in the capacity of a server machine in client-server network environment. The computing device 1100 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1100 may implement the above described methods 200-300 for providing a high availability scheduler in a search head cluster.

The example computing device 1100 may include a processing device (e.g., a general purpose processor) 1102, a main memory 1104 (e.g., synchronous dynamic random access memory (DRAM), read-only memory (ROM)), a static memory 1106 (e.g., flash memory and a data storage device 1118), which may communicate with each other via a bus 1130.

The processing device 1102 may be provided by one or more general-purpose processing devices such as a microprocessor, central processing unit, or the like. In an illustrative example, the processing device 1102 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1102 may be configured to execute the methods 200-300 for providing a high availability scheduler in a search head cluster, in accordance with one or more aspects of the present disclosure.

The computing device 1100 may further include a network interface device 1108, which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

The data storage device 1118 may include a computer-readable storage medium 1128 on which may be stored one or more sets of instructions (e.g., instructions of the methods 200-300 for providing a high availability scheduler in a search head cluster, in accordance with one or more aspects of the present disclosure) implementing any one or more of the methods or functions described herein. Instructions implementing methods 200-300 may also reside, completely or at least partially, within main memory 1104 and/or within processing device 1102 during execution thereof by computing device 1100, main memory 1104 and processing device 1102 also constituting computer-readable media. The instructions may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "causing", "receiving", "obtaining", "displaying", "associating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   entering, by a server device of a plurality of server devices, a leader state based upon a result of a consensus election process in which the server device participates with the plurality of server devices;
   based on being in the leader state, scheduling, by the server device, one or more tasks by assigning each of the one or more tasks to a device, wherein scheduling a task comprises sending a command and an associated nonce to the device; and
   receiving a confirmation that the task has been performed, the confirmation comprising the nonce.

2. The method of claim 1, wherein the consensus election process comprises a Raft consensus election process.

3. The method of claim 1, further comprising continuing participation in the consensus election process after entering the leader state to enable another server device in the plurality of server devices to assume scheduling responsibilities in case of computer or network breakdown affecting the server device.

4. The method of claim 1, further comprising continuing participation in a Raft consensus election process after entering the leader state to enable another server device in the plurality of server devices to assume scheduling responsibilities in case of computer or network breakdown affecting the server device.

5. The method of claim 1, wherein the plurality of server devices comprise a search head cluster, each of the plurality of server devices configured to enable it to perform a reduce phase of a map-reduce search.

6. The method of claim 1, wherein the one or more tasks comprise initiating a scheduled search at a particular time.

7. The method of claim 1, wherein the one or more tasks comprises initiating a map-reduce search that uses a late-binding schema.

8. The method of claim 1, wherein the one or more tasks comprise initiating a search of time-stamped events, each event including a portion of raw machine data.

9. The method of claim 1, wherein entering the leader state based upon the results of the consensus election process comprises:
   entering a candidate state;
   requesting votes for the server device from others of the plurality of server devices; and
   receiving votes for the server device from at least a majority of the plurality of server devices.

10. The method of claim 1, wherein entering the leader state based upon the results of the consensus election process comprises:
    determining that a heartbeat timeout has occurred;
    entering a candidate state based upon the determining that the heartbeat timeout has occurred;
    requesting votes for the server device from others of the plurality of server devices; and
    receiving votes for the server device from at least a majority of the plurality of server devices.

11. The method of claim 1, wherein entering the leader state based upon the results of the consensus election process comprises:
    randomly selecting a heartbeat timeout period of time;
    determining that the heartbeat timeout period of time has elapsed without receiving a heartbeat message from one of the plurality of server devices;
    entering a candidate state based upon the determining that the heartbeat timeout period of time has elapsed;
    requesting votes for the server device from others of the plurality of server devices; and
    receiving votes for the server device from at least a majority of the plurality of server devices.

12. The method of claim 1, wherein entering the leader state based upon the results of the consensus election process comprises:
    entering a candidate state;
    issuing a first vote for the server device;
    requesting second votes for the server device from others of the plurality of server devices; and
    receiving votes for the server device from at least a majority of the plurality of server devices, wherein the votes from the at least the majority of the plurality of server devices comprises the first vote and one or more of the second votes.

13. The method of claim 1, wherein entering the leader state based upon the results of the consensus election process comprises:
    entering a candidate state;
    incrementing a current term value;
    requesting votes for the server device from others of the plurality of server devices, the request comprising the incremented current term value; and
    receiving votes for the server device from at least a majority of the plurality of server devices.

14. The method of claim 1, wherein scheduling the one or more tasks further comprises:
    determining the one or more tasks;
    selecting, for each of the one or more tasks, a respective one of a plurality of devices; and
    sending, for each of the one or more tasks, a command to the selected one of the plurality of devices to perform the task.

15. The method of claim 1, wherein scheduling the one or more tasks further comprises:
    determining the one or more tasks by accessing a configuration file indicating one or more scheduled tasks to be performed;
    selecting, for each of the one or more tasks, a respective one of a plurality of devices; and
    sending, for each of the one or more tasks, a command to the selected one of a plurality of devices to perform the task.

16. The method of claim 1, wherein scheduling the one or more tasks further comprises:
    determining the one or more tasks;
    selecting, for each of the one or more tasks, a respective one of a plurality of devices based on scheduled loads of the plurality of devices; and
    sending, for each of the one or more tasks, a command to the selected one of the plurality of devices to perform the task.

17. The method of claim 1, wherein scheduling the one or more tasks further comprises:
    determining the one or more tasks;
    selecting, for each of the one or more tasks, a respective one of a plurality of devices based on a number of processing slots of the plurality of devices; and
    sending, for each of the one or more tasks, a command to the selected one of the plurality of devices to perform the task.

18. The method of claim 1, wherein scheduling the one or more tasks further comprises:
   determining the one or more tasks;
   selecting, for each of the one or more tasks, a respective one of a plurality of devices;
   sending, for each of the one or more tasks, a command and an associated nonce to the selected one of the plurality of devices to perform each task; and
   receiving, for each of the one or more tasks, a confirmation that each task has been performed, wherein the confirmation comprises the nonce.

19. The method of claim 1, wherein scheduling the one or more tasks further comprises assigning each of the one or more tasks so as to balance work loads of a plurality of devices.

20. A server device comprising:
   a memory; and
   a processing device coupled with the memory, the processing device to:
      enter a leader state based upon a result of a consensus election process in which the server device participated with a plurality of server devices; and
      based on being in the leader state, schedule one or more tasks by assigning each of the one or more tasks to a device, wherein schedule a task comprises sending a command and an associated nonce to the device; and
      receive, for at least one of the one or more tasks, a confirmation that the task has been performed, wherein the confirmation comprises the nonce.

21. The system of claim 20, wherein the processing device is to continue participation in the consensus election process after entering the leader state to enable another server device in the plurality of server devices to assume scheduling responsibilities in case of computer or network breakdown affecting the server device.

22. The server device of claim 20, wherein the plurality of server devices comprises a search head cluster, each of the plurality of server devices configured to enable it to perform a reduce phase of a map-reduce search.

23. The server device of claim 20, wherein the one or more tasks comprise initiating a scheduled search at a particular time.

24. The server device of claim 20, wherein to schedule the one or more tasks further comprises the processing device to:
   determine the one or more tasks by accessing a configuration file indicating one or more scheduled tasks to be performed;
   select, for each of the one or more tasks, a respective one of a plurality of devices; and
   send, for each of the one or more tasks, a command to the selected one of the plurality of devices to perform the task.

25. The server device of claim 20, wherein to schedule the one or more tasks further comprises the processing device to:
   determine the one or more tasks;
   select, for each of the one or more tasks, a respective one of a plurality of devices based on scheduled loads of the plurality of devices; and
   send, for each of the one or more tasks, a command to the selected one of the plurality of devices to perform the task.

26. A non-transitory computer-readable medium having instructions encoded thereon which, when executed by a processing device of a server device, causes the processing device to perform operations comprising:
   entering a leader state based upon a result of a consensus election process in which the server device participates with a plurality of server devices;
   based on being in the leader state, scheduling one or more tasks to be performed by assigning each of the one or more tasks to a device, wherein scheduling a task comprises sending a command and an associated nonce to a device; and
   receiving a confirmation that the task has been performed, the confirmation comprising the nonce.

27. The non-transitory computer-readable medium of claim 26, wherein the consensus election process comprises a Raft consensus election process.

28. The non-transitory computer-readable medium of claim 26, wherein the operations further comprise continuing participation in the consensus election process after entering the leader state to enable another server device in the plurality of server devices to assume scheduling responsibilities in case of computer or network breakdown affecting the server device.

29. The non-transitory computer-readable medium of claim 26, wherein the plurality of server devices comprise a search head cluster, each of the plurality of server devices configured to enable it to perform a reduce phase of a map-reduce search and wherein the one or more tasks comprise initiating a scheduled search at a particular time.

30. The non-transitory computer-readable medium of claim 26, wherein scheduling the one or more tasks further comprises:
   determining the one or more tasks;
   selecting, for each of the one or more tasks, a respective one of a plurality of devices based on scheduled loads of the plurality of devices; and
   sending, for each of the one or more tasks, a command to the selected one of the plurality of devices to perform the task.

* * * * *